Figure 1:
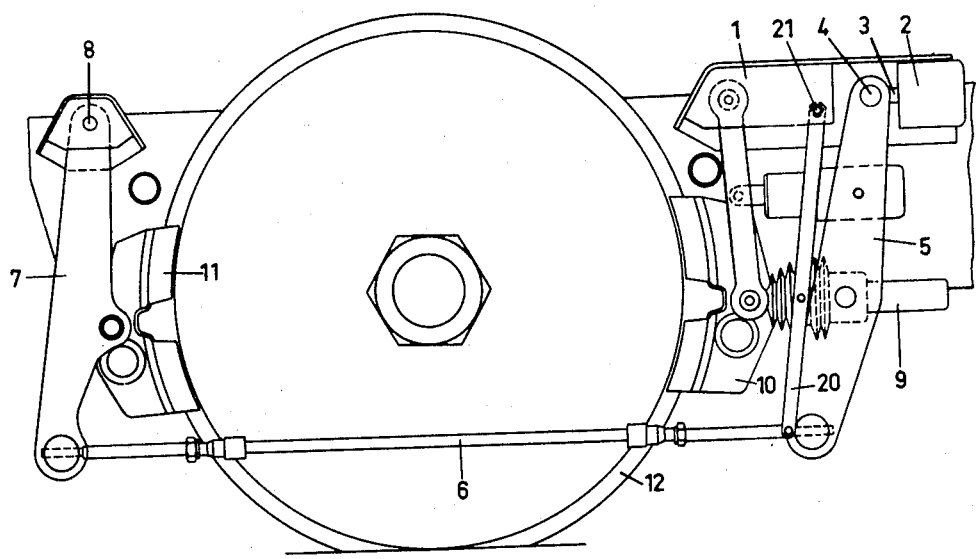

United States Patent

[11] 3,624,766

[72] Inventor Nils Borje Lennart Sander
　　　　　　　Malmo, Sweden
[21] Appl. No. 8,609
[22] Filed Feb. 4, 1970
[45] Patented Nov. 30, 1971
[73] Assignee Svenska Aktiebolaget Bromsregulator
　　　　　　　Malmo, Sweden
[32] Priority Feb. 14, 1969
[33] 　　　　　Great Britain
[31] 　　　　　8,051/69

[54] RAILWAY VEHICLE WHEEL BRAKE RIGGING
4 Claims, 4 Drawing Figs.

[52] U.S. Cl. .................................................. 188/202,
　　　　　　　　　　　　　　　　　　　　　　　　　188/56
[51] Int. Cl. .................................................F16d 65/66,
　　　　　　　　　　　　　　　　　　　　　　　　　B61h 15/00

[50] Field of Search............................................188/56, 196
　　　　P, 196 B, 196 BA, 153 R, 197, 198-203 PS, 203 S

[56] References Cited
UNITED STATES PATENTS

| | | | |
|---|---|---|---|
| 1,336,522 | 4/1920 | Hunzicker.................. | 188/199 PS |
| 1,723,527 | 8/1929 | Sauvage ..................... | 188/199 PS |
| 2,561,454 | 7/1951 | Williams...................... | 188/56 X |
| 3,253,682 | 5/1966 | Haydu ......................... | 188/56 X |
| 3,430,740 | 3/1969 | Larsson et al................ | 188/202 S |

Primary Examiner—Duane A. Reger
Attorney—Laurence R. Brown

ABSTRACT: A railroad automatic-adjusting braking system is disclosed with a dead and live lever arrangement wherein a slack adjusting unit is located in the linkage between the brake shoe and one of the brake levers.

PATENTED NOV 30 1971

3,624,766

SHEET 1 OF 4

INVENTOR

Nils B. L. Sander

BY Laurence R. Brown
ATTORNEY

RAILWAY VEHICLE WHEEL BRAKE RIGGING

This invention relates to a compact clasp brake rigging for a railway vehicle and of the kind (hereinafter called "the kind referred to") comprising a live brake lever pivotally connected at one end to the piston rod of a pneumatic cylinder piston unit, a dead brake lever pivotally connected at one end to a part of the vehicle frame, a tension force transmitting rod connected to the other ends of said live and dead brake levers, and brake shoes pivotally mounted between said live and dead brake levers and an adjacent vehicle wheel rim.

In respect of known brake riggings of the kind referred to several proposals have been made for incorporating slack adjusters for automatic compensation of the effects of wear on the braking surfaces on the wheel rim and the brake blocks. Thus it has been proposed to provide the cylinder piston unit with a built-in slack adjuster in the piston rod. Another proposal has been to mount a slack adjuster in the tension force transmitting rod. Still another proposal has been to mount a slack adjuster at the pivot connection between the dead brake lever and the frame of the vehicle. In many instances none of those proposals can be used. One reason may be that the space necessary is not available. Another reason may be that the magnitude and/or the direction of the forces in the brake rigging will alter too much as the effects of wear and the consequential slack adjustment increase more and more.

The present invention is therefore intended to provide an improved brake rigging of the kind referred to which is of compact design and such that the effects of wear on the braking surfaces will have little or no influence upon the magnitude and direction of the brake-applying forces transmitted by the rigging.

According to the invention there is provided a brake rigging of the kind referred to characterized in that an automatic push-transmitting slack adjuster is mounted between one of the brake shoes and the respective adjacent brake lever.

Figure 2:
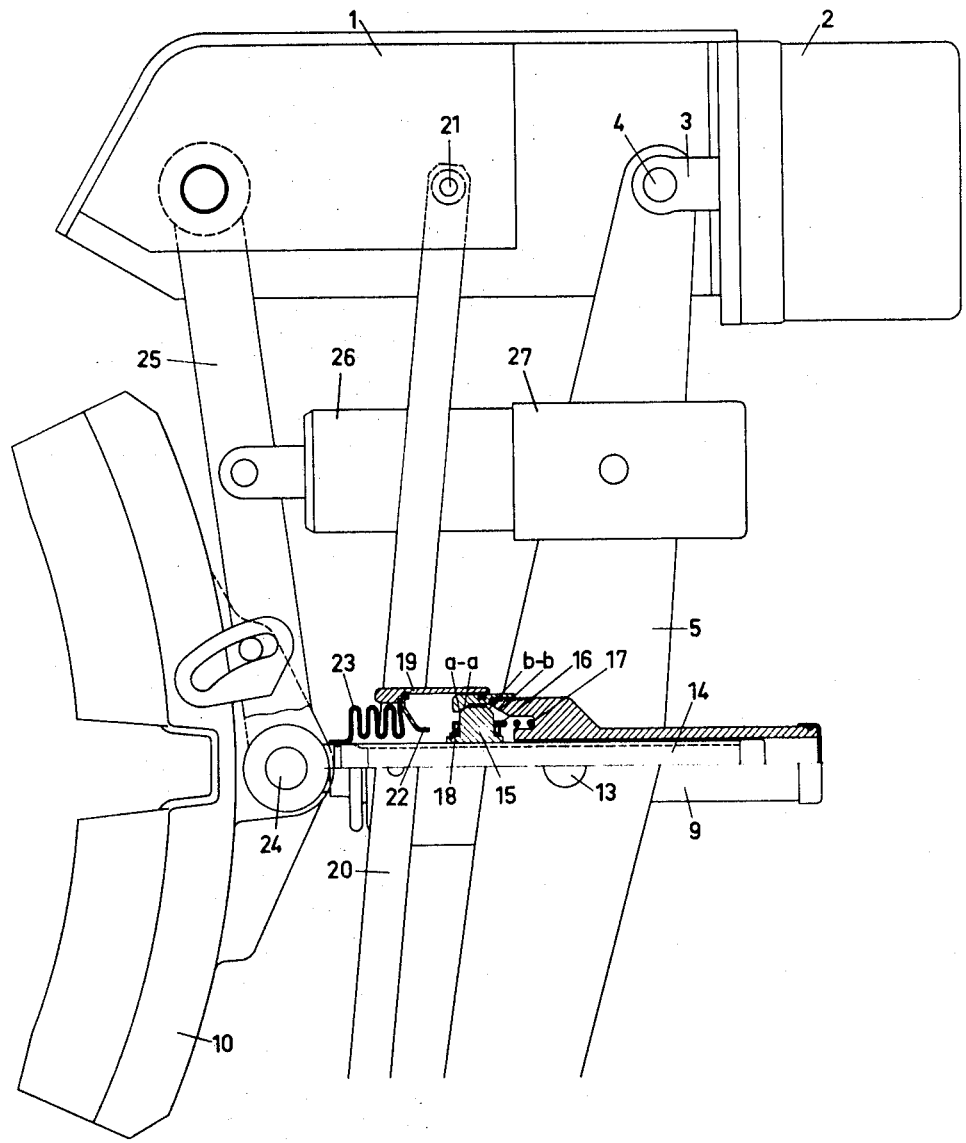
Figure 3:
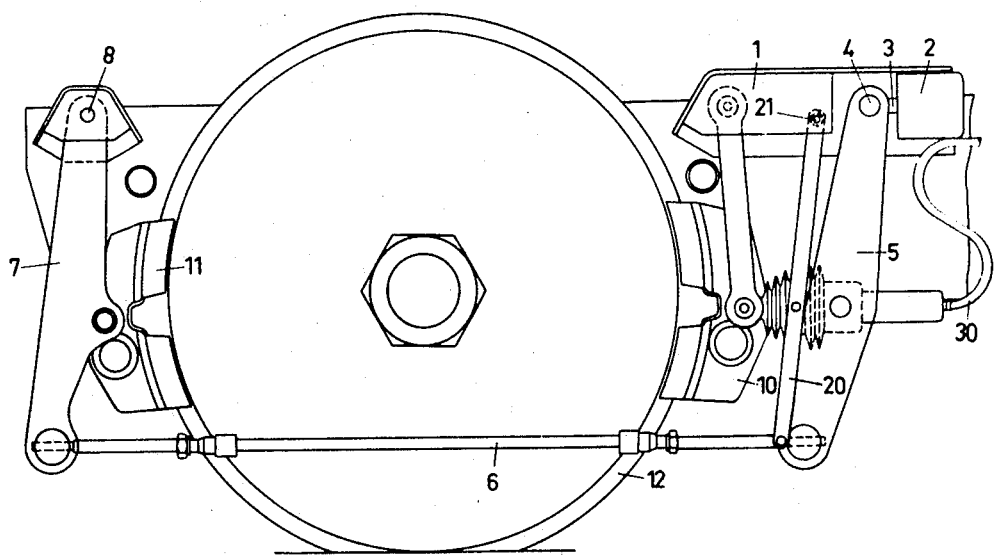
Figure 4:
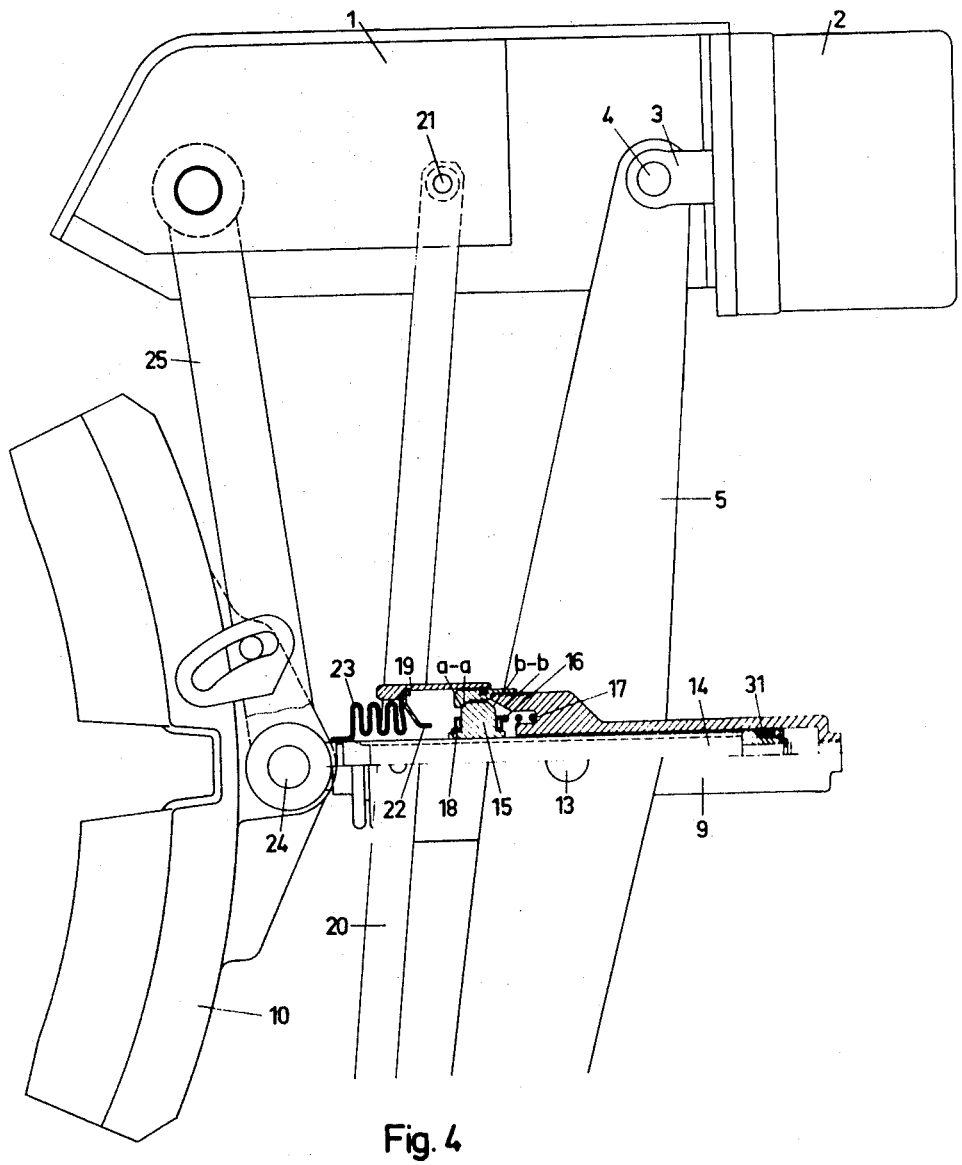

How the invention may be performed is described in more detail with reference to the accompanying drawings, in which FIG. 1 represents a brake rigging according to the invention in side view, FIG. 2 shows some parts of the brake rigging shown in FIG. 1 to a larger scale and shows the slack adjuster partly in section, FIG. 3 represents another embodiment of a brake rigging according to the invention in side view, and FIG. 4 shows some parts of the brake rigging shown in FIG. 3 to a larger scale and shows the slack adjuster partly in section.

Referring to FIGS. 1 and 2, the railway vehicle frame 1 carries a cylinder piston unit 2 having a piston rod 3 pivotally connected at 4 to the upper end of a live brake lever 5, the lower end of which is pivotally connected to a pull rod 6 which in turn is pivotally connected to the lower end of a dead brake lever 7. The said dead brake lever 7 is pivotally connected to the vehicle frame by connection means 8. The live brake lever 5 carries a pivotally connected push member 9 which in turn acts upon a brake shoe 10, as explained in more detail below with reference to FIG. 2. The dead brake lever 7 carries a pivotally connected brake shoe 11. The two brake shoes are adapted to engage a rim of a wheel 12.

It will be readily understood that the brake rigging shown in FIG. 1 as described above will operate in the manner of a conventional brake rigging of the kind referred to, but in accordance with the invention the push member 9 is included in an automatic push-transmitting slack adjuster which is mounted between the brake shoe 10 and the respective adjacent brake lever 5. The slack adjuster is of compact construction and its length increases to compensate for the effects of wear on the braking surfaces. It will be understood that in the present brake rigging, where the slack adjuster is mounted between the brake shoe 10 and one of the elements transmitting force to the brake block (i.e. the live brake lever 5) the compensation for the effects of the wear on the braking surfaces on the wheel 12 and the brake shoe 10 will not cause any undesirable changes in the magnitudes and the directions of the forces transmitted through the rigging for applying the brake.

As will be understood the above-described construction is of advantage in practice only when using a slack adjuster of a compact design and such a slack adjuster is shown in FIG. 2.

Referring to FIG. 2, the live brake lever 5 is connected to a part of the push member 9 by a pivot 13. The push member 9 is of tubular form and encloses a screw-threaded rod part 14, the screw threads of which are of such pitch as to be nonself-locking. A nut 15 is threaded on the rod part 14 and is provided at both ends with conical locking surfaces adapted to engage corresponding locking surfaces provided on shoulders in the tubular member 9. The locking surfaces at the left-hand side of the nut 15 form a clutch $a-a$, and the locking surfaces on the right-hand end of the nut 15 form a clutch $b-b$. A roller bearing 16 and a helical compression spring 17 are clamped between the right-hand end side of the nut 15 and a shoulder surface on the member 9. Another roller bearing 18 is provided at the left-hand end side of the nut 15. A sleeve 19 telescopically mounted relative to the member 9 is pivotally connected to a lever 20, which at its upper end in turn is pivotally connected at 21 to the vehicle frame and at its lower end is pivotally connected to the pull rod 6. The sleeve 19 contains a cup-shaped spring 22 and is closed at its left-hand end by an expansible dirt-excluding rubber sleeve 23 the one end of which is connected to the rod part 14 and the other end of which is connected to the sleeve 19. The brake shoe 10 is pivotally connected by pivot connection means 24 to the screw-threaded rod part 14, and a lever 25 is pivotally connected at its upper end to the vehicle frame 1, and at the other end to the pivot connection means 24. A strong compression spring (not shown) is enclosed in two telescopically displaceable tubes 26 and 27, the tube 26 being pivotally connected to the lever 25 and the tube 27 being pivotally connected to the live brake lever 5.

The operation is normally as follows:

The strong compression spring inside the tubes 26 and 27 will tend to move the levers 25 and 5 apart and thus to pull the rod part 14 outwards from the member 9. However, the clutch $a-a$ is engaged and prevents the nut 15 from being rotated on the rod part 14. Upon starting a braking cycle the piston rod 3 is advanced towards the pivoted connection at 21 and during the application of the brake the sleeve 19 and the member 9 are moved towards each other. The cup spring 22 will engage the roller bearing 18 at the moment the brake block fitted to the brake shoe 10 has engaged the wheel rim and the brake-applying force has become equivalent to the force derived from the strong spring inside the tubes 26 and 27. The clutch $a-a$ will now open and the clutch $b-b$ will be engaged. Upon a further increase in brake-applying force the member 9 and part 14 will be moved together slightly further towards the wheel rim and the spring 22 will be deflected correspondingly.

During the following brake-release operation the member 9 and part 14 will initially be moved together towards the right. The clutch $b-b$ will open and the clutch $a-a$ will be engaged as soon as the brake-applying force transmitted becomes equivalent to the force transmitted by the strong compression spring inside the tubes 26 and 27. At the same moment the spring 22 will leave the bearing 18 and the brake rigging parts will return to their initial positions.

In case wear of the braking surfaces has occurred, a braking cycle will include a slack adjustment as follows:

During the brake application the spring 22 will contact the bearing 18 at a moment when the brake-applying force transmitted is less than the force transmitted through the clutch $a-a$ and originating from the strong compression spring within the tubes 26 and 27. The spring 22 will thus increase the resistance against the brake application, and as soon as this resistance is equivalent to the force transmitted at the clutch $a-a$, said clutch $a-a$ will open. The nut 15 is now free to rotate on the screw threads of the rod part 14 and will in fact carry out such rotation due to the force derived from the strong spring within the tubes 26 and 27 tending to move the levers 25 and 5 apart. The rotation of the nut 15 and the outward movement of the rod part 14 from the member 9 will continue until the brake block carried by the brake shoe 10 engages the wheel rim. During the rotation of the nut 15 the spring 22 will expand, and after the brake block in the shoe 10 has contacted the wheel rim the spring 22 may be compressed again during the increase of brake-applying force at the last stage of the brake application. The slack adjustment has thus been effected during the application of the brakes, and the following brake-release operation will be performed as usual.

The rigging shown in FIGS. 3 and 4 differs from the one shown in FIGS. 1 and 2 mainly in that the strong compression spring and its surrounding tubes 26 and 27 have been omitted. A force tending to move the levers 25 and 5 apart is derived from a cushion of compressed air contained in a chamber at the right-hand end of the member 9. The air is supplied from the main air pipe through a hose 30 and a nonreturn valve (not shown). The compressed air exerts pressure on the right-hand end of the rod part 14, which is provided with a gland 31.

The rigging shown in FIGS. 3 and 4 operates in substantially the same manner as that shown in FIGS. 1 and 2, but has an advantage in that the weight of the rigging is smaller due to the omission of the tubes 26 and 27 and the strong compression spring therein.

I claim:

1. A compact clasp brake rigging for a railway vehicle and of the kind comprising a live brake lever pivotally connected at one end to a piston rod of a pneumatic cylinder piston unit, a dead brake lever pivotally connected at one end to a part of a vehicle frame, a tension-force-transmitting rod connected to the other ends of said live and dead brake levers, and brake shoes pivotally mounted between said live and dead brake levers and an adjacent vehicle wheel rim, characterized in that an automatic push-transmitting slack adjuster is mounted between one of the brake shoes and the respective adjacent brake lever to transmit the force between the brake lever and the brake shoe.

2. A brake rigging as defined in claim 1 wherein the slack adjuster includes a threaded rod with a nonself-locking nut thereon extended between one brake lever and a brake shoe, means to permit the nut to turn to thereby adjust the distance between the lever and brake shoe to take up slack in the braking system including clutch means for holding said nut when slack is not excessive and biasing means for causing the nut to turn relative to the rod when slack exists.

3. A brake rigging as defined in claim 2 wherein the biasing means comprises a strong compression spring mounted to exert pressure between said brake lever and said brake shoe.

4. A brake rigging as defined in claim 2 wherein the biasing means comprises a compressible air supply reacting against said rod.

* * * * *